March 23, 1926. 1,577,588
D. T. PHILLIPS
COMBINED TRACTOR AND ROAD VEHICLE
Filed May 3, 1923 10 Sheets-Sheet 3
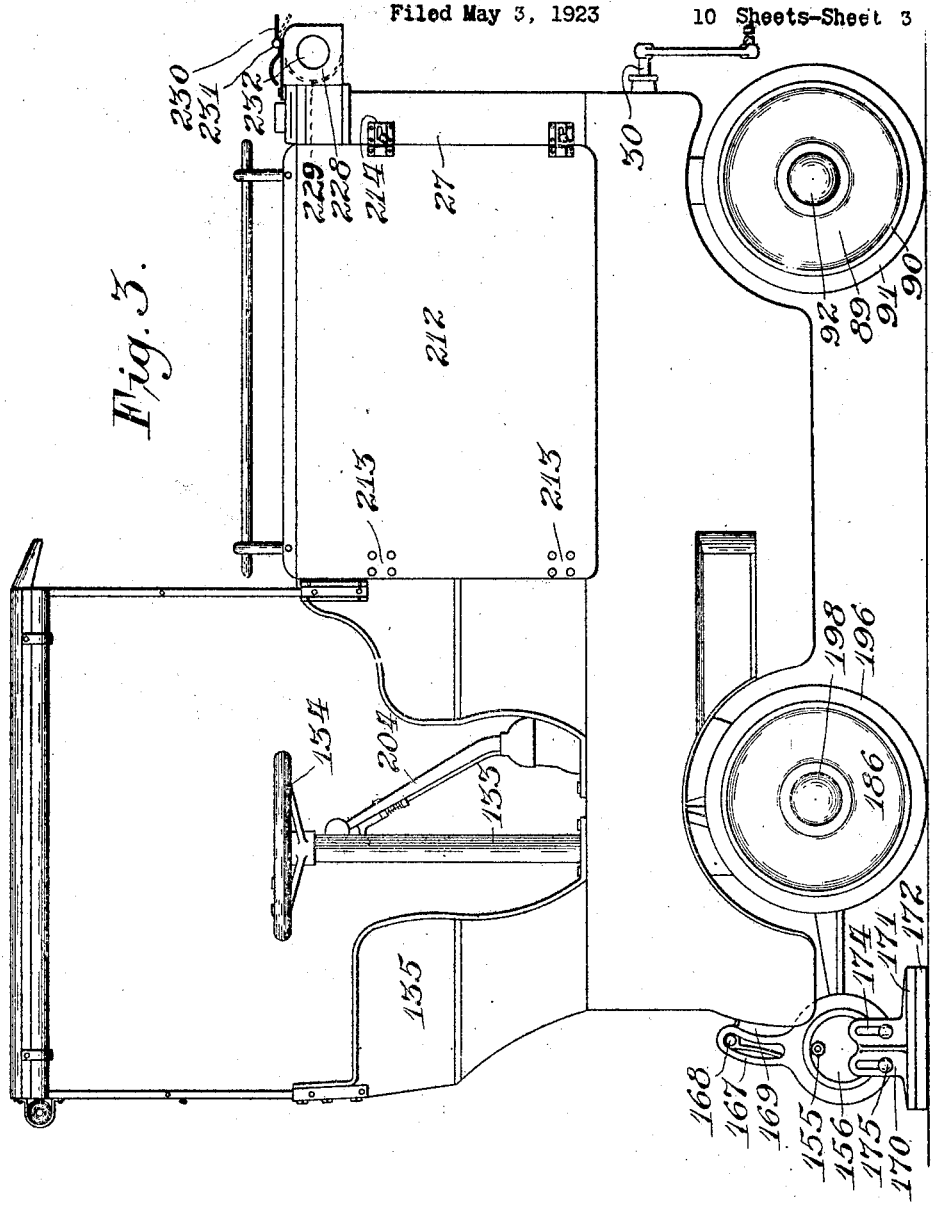
Inventor:
Darius T. Phillips
By Banning & Banning
his Attorneys.

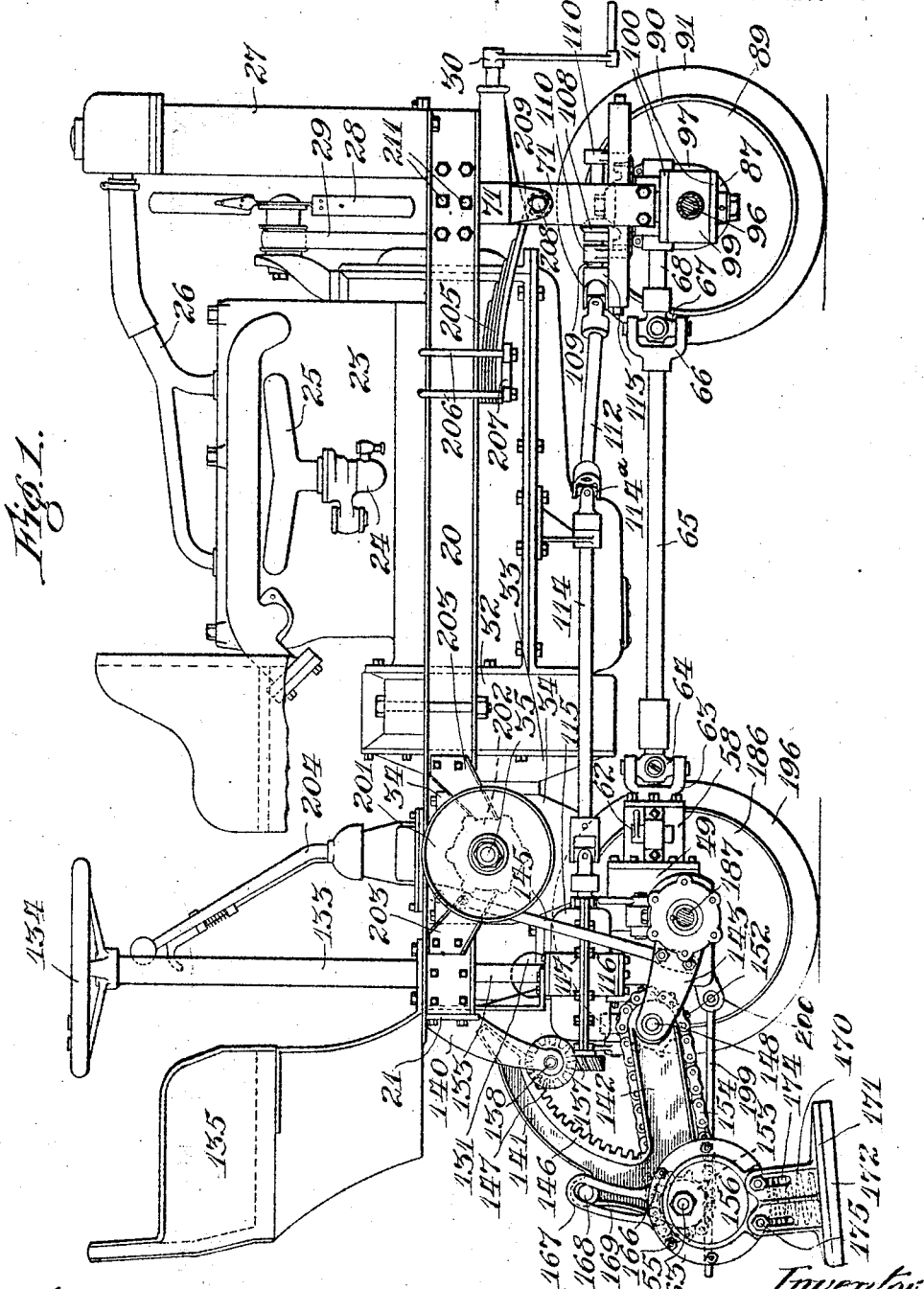

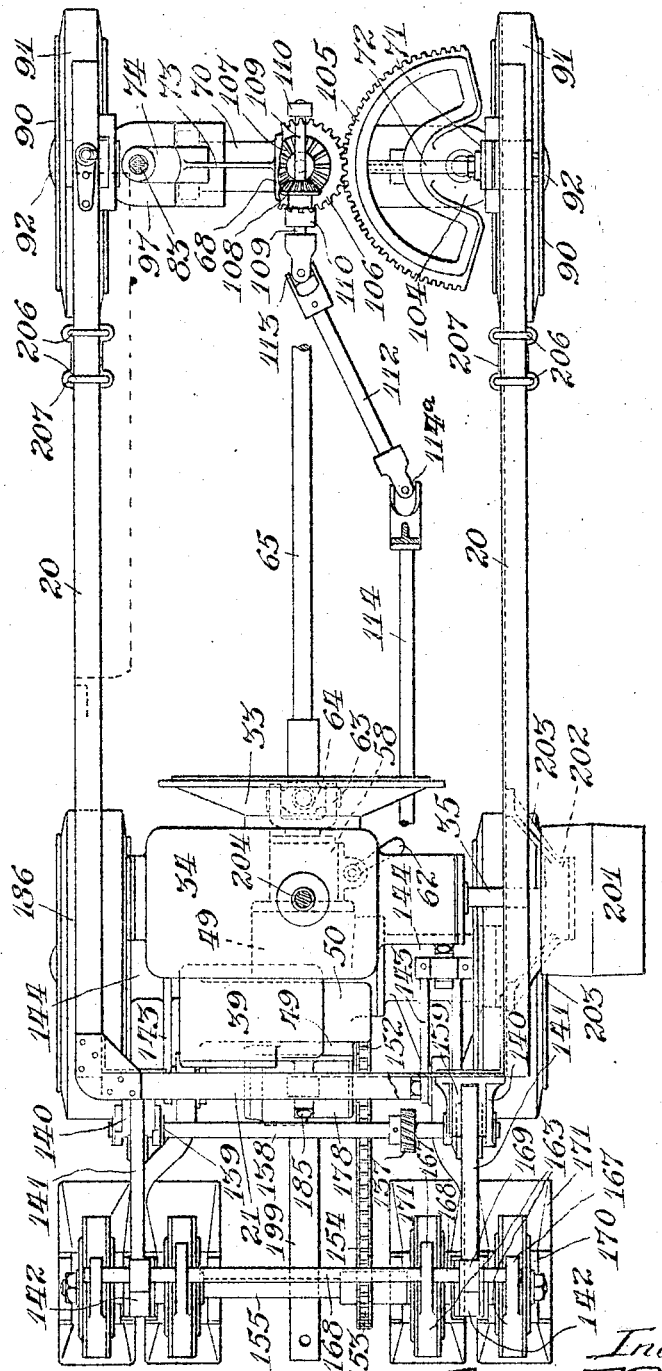

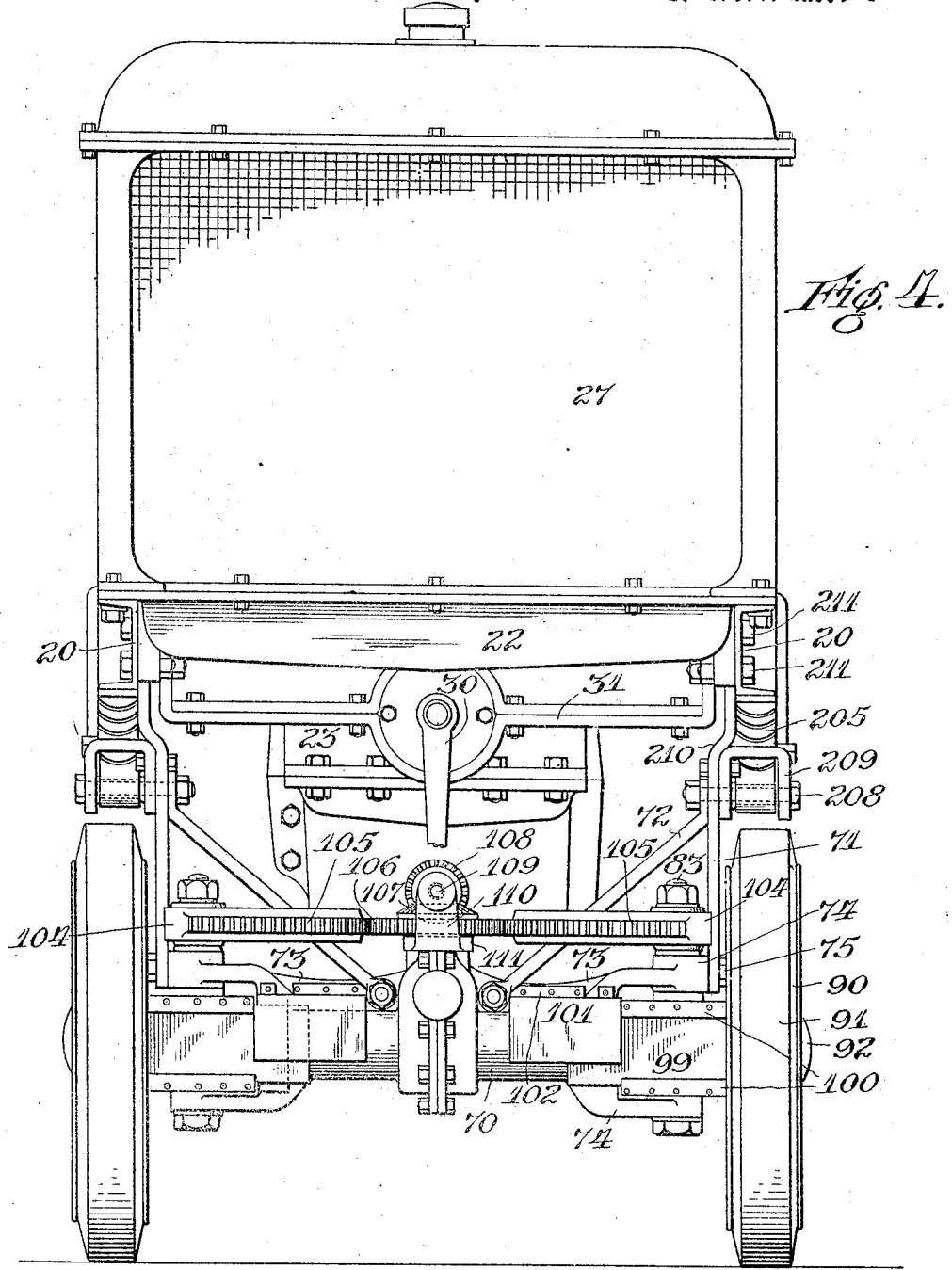

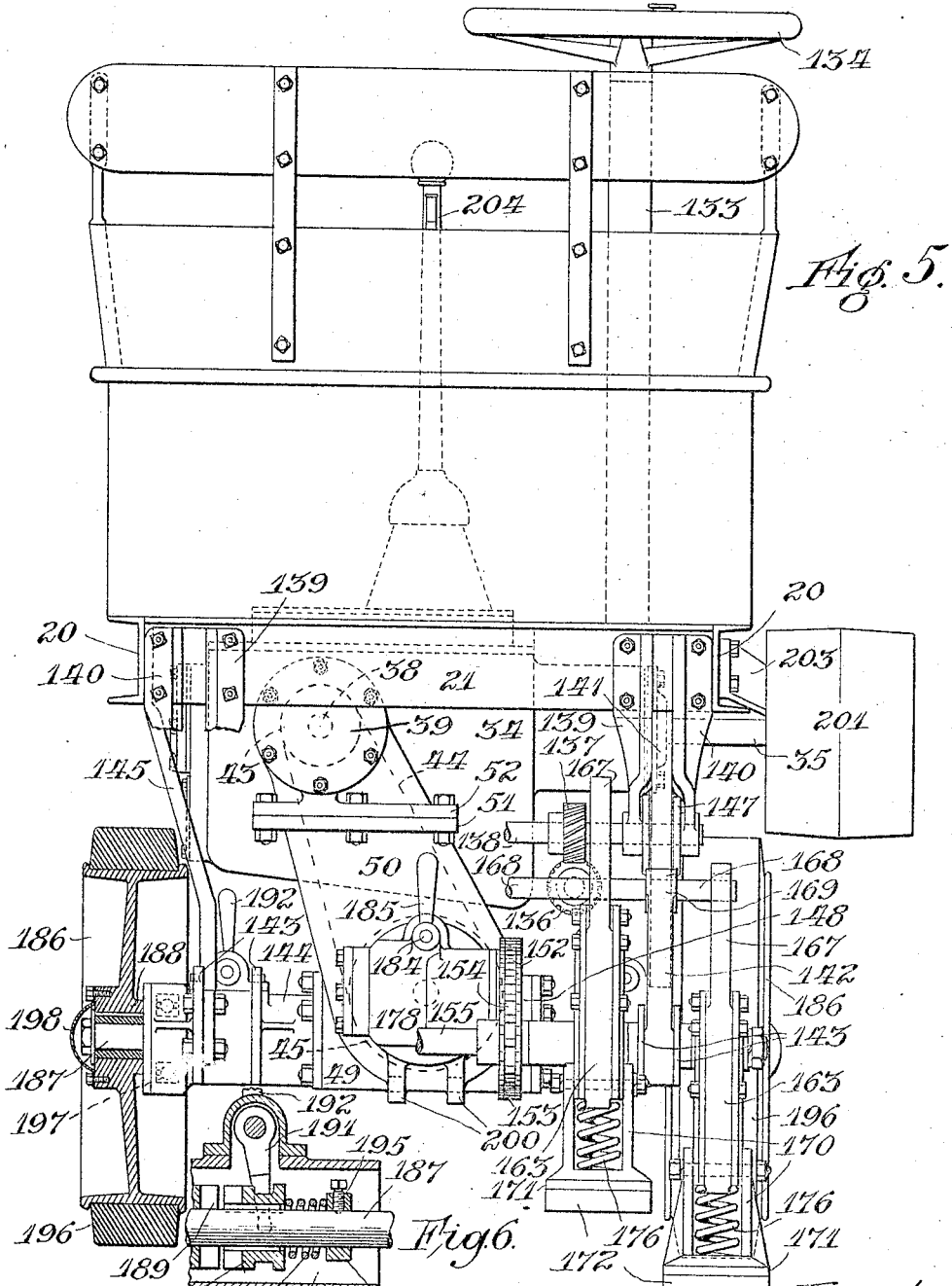

March 23, 1926.
D. T. PHILLIPS
1,577,588
COMBINED TRACTOR AND ROAD VEHICLE
Filed May 3, 1923   10 Sheets-Sheet 6
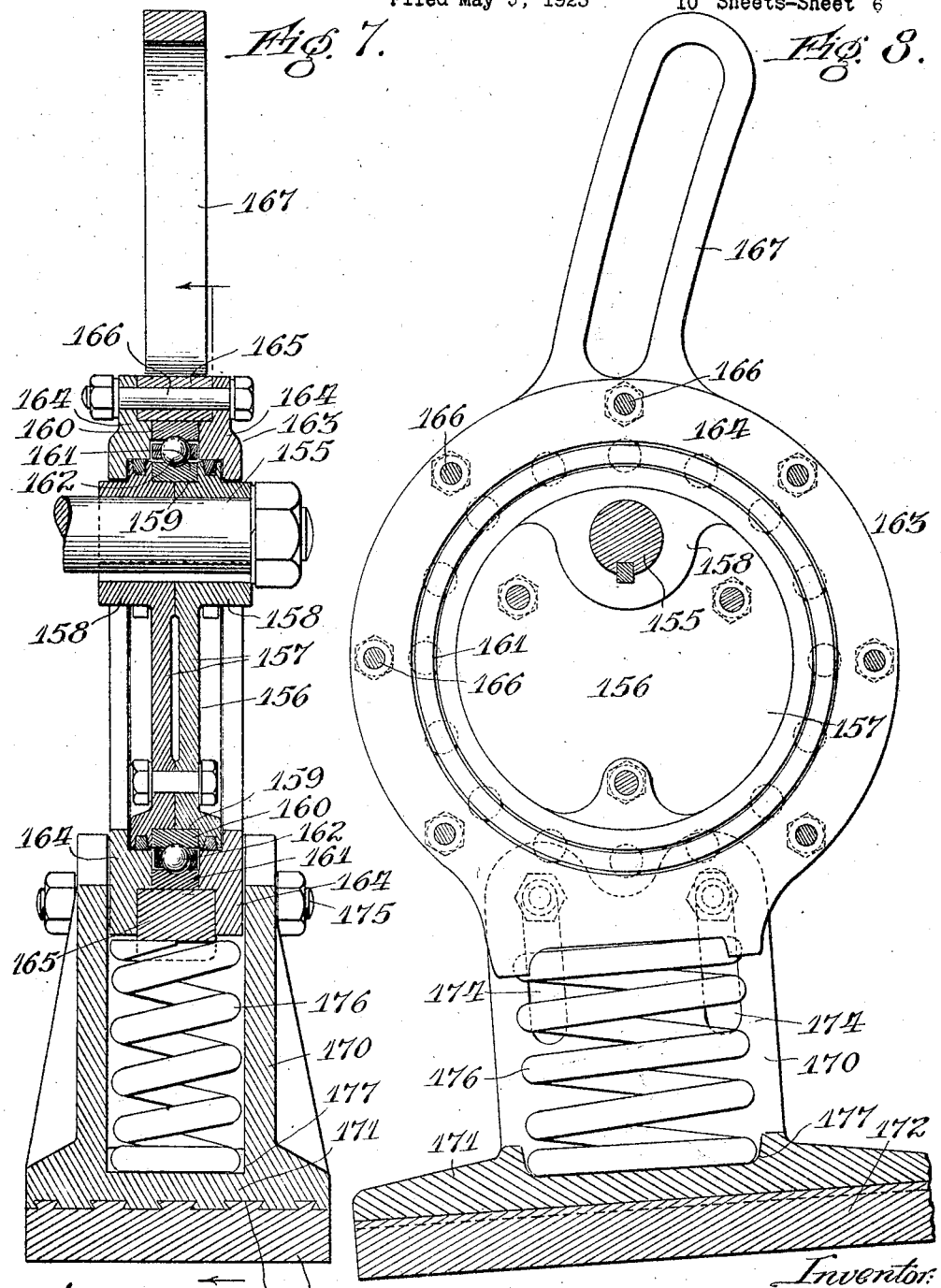

March 23, 1926. 1,577,588
D. T. PHILLIPS
COMBINED TRACTOR AND ROAD VEHICLE
Filed May 3, 1923 10 Sheets-Sheet 7
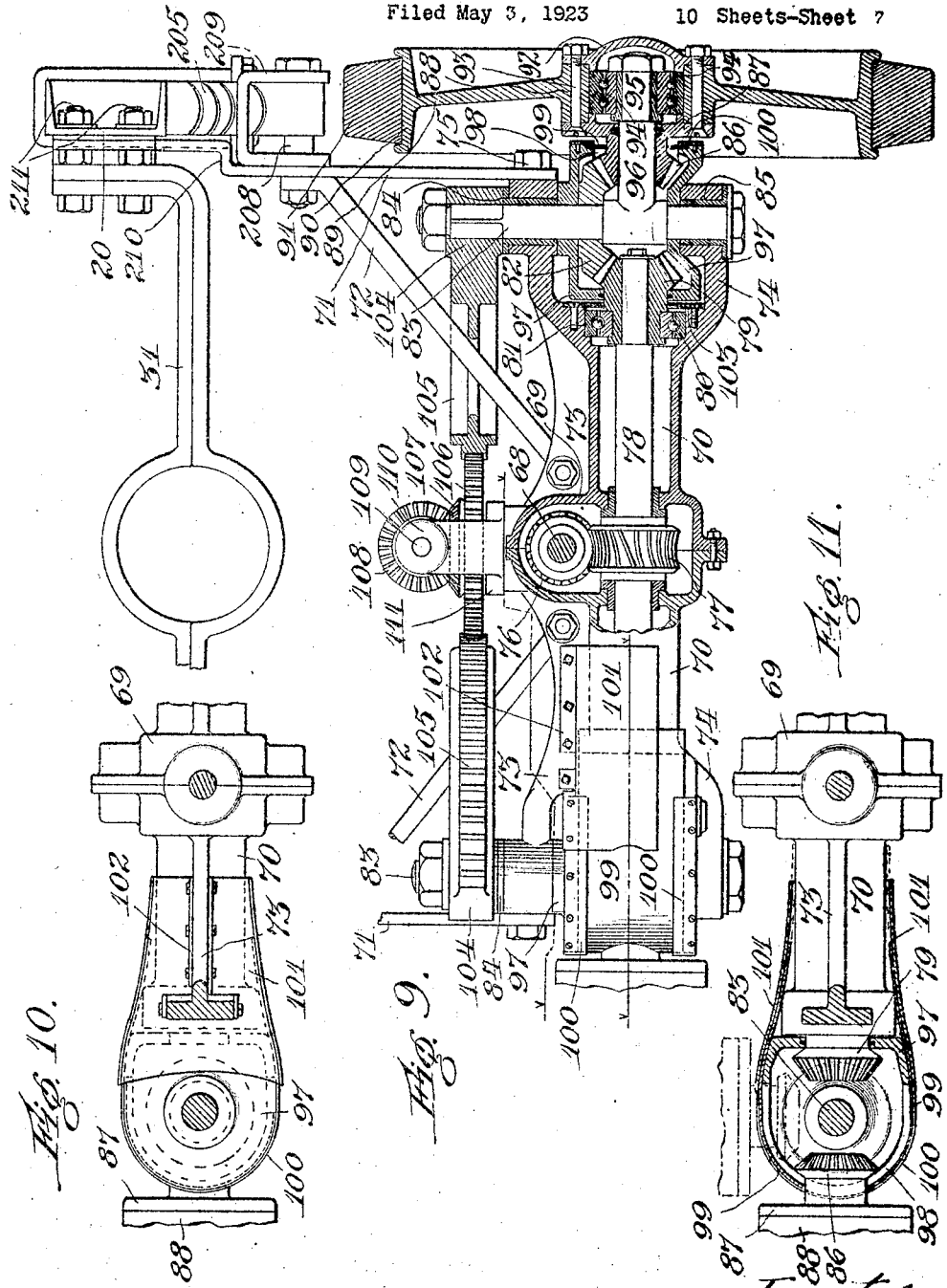

March 23, 1926.  1,577,588
D. T. PHILLIPS
COMBINED TRACTOR AND ROAD VEHICLE
Filed May 3, 1923  10 Sheets-Sheet 8

Inventor:
Darius T. Phillips
By Banning & Banning
his Attorneys.

March 23, 1926.  1,577,588
D. T. PHILLIPS
COMBINED TRACTOR AND ROAD VEHICLE
Filed May 3, 1923   10 Sheets-Sheet 9
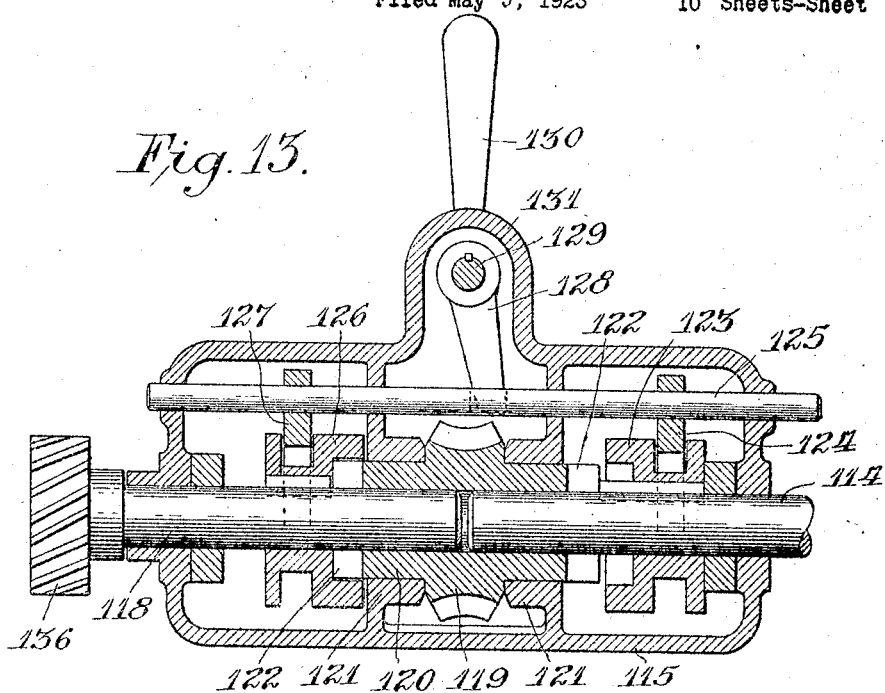
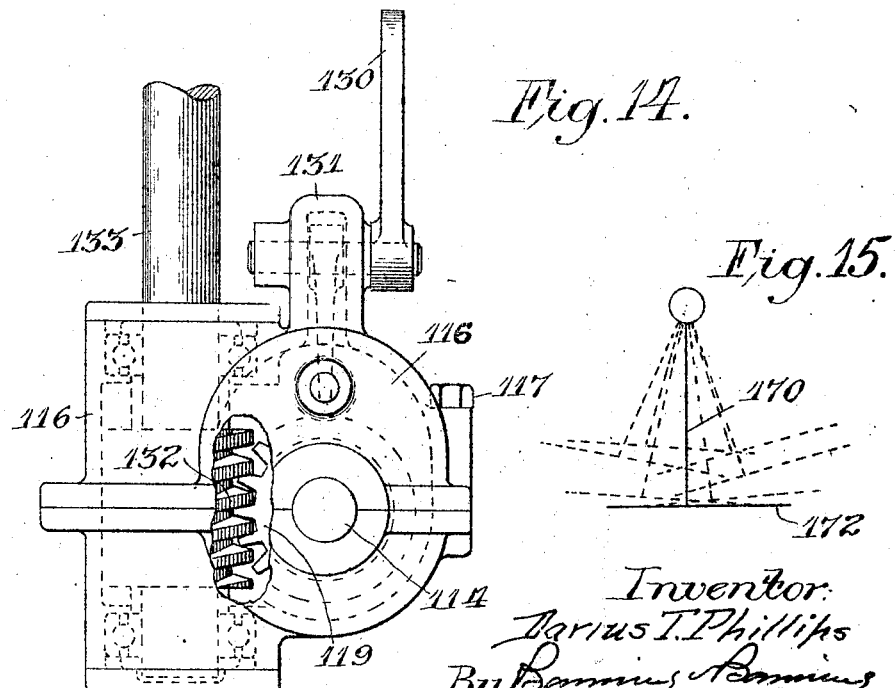

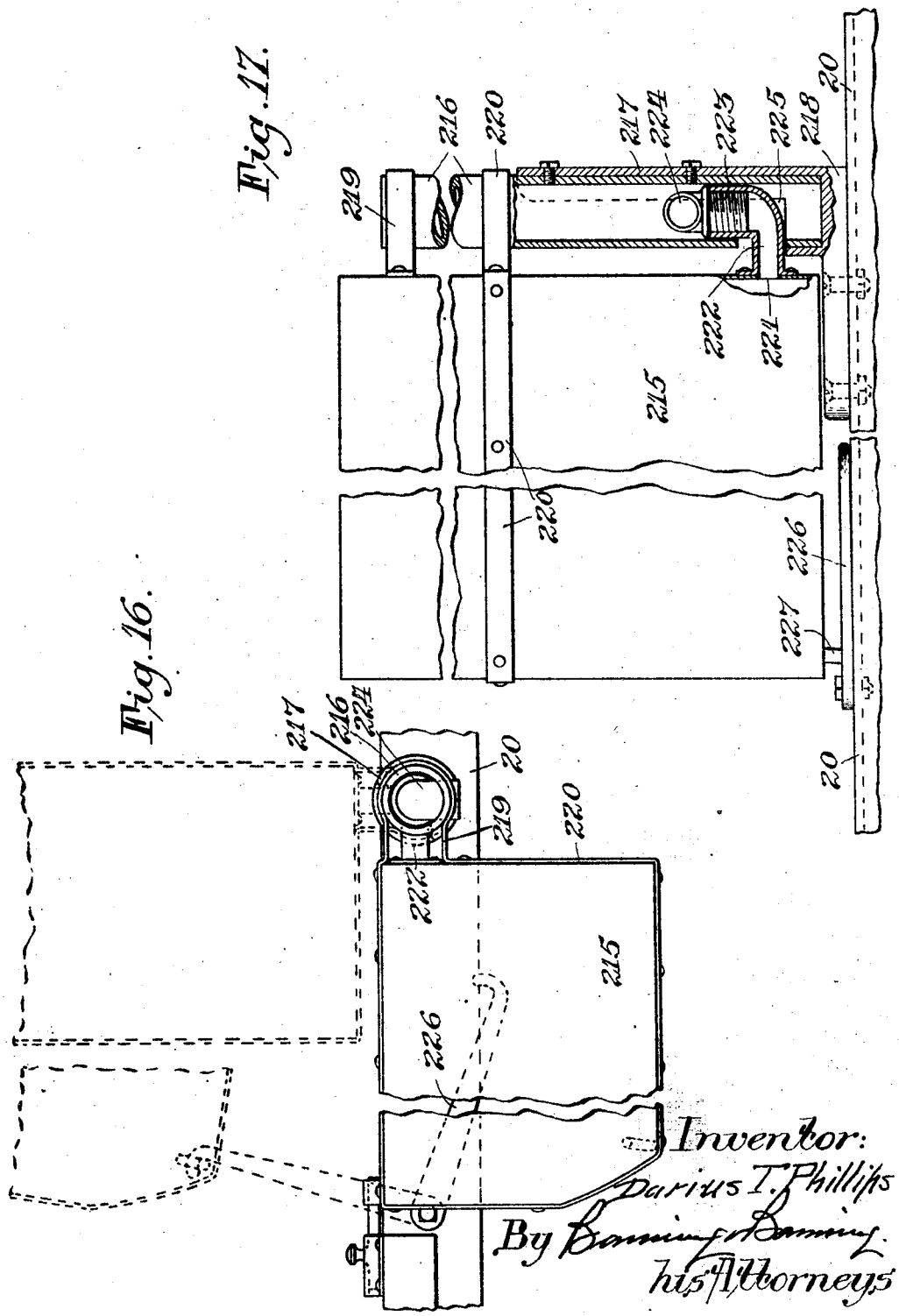

Patented Mar. 23, 1926.

1,577,588

UNITED STATES PATENT OFFICE.

DARIUS T. PHILLIPS, OF CHICAGO, ILLINOIS.

COMBINED TRACTOR AND ROAD VEHICLE.

Application filed May 3, 1923. Serial No. 636,283.

*To all whom it may concern:*

Be it known that I, DARIUS T. PHILLIPS, a citizen of the United States, residing at Chicago, in the county of Cook and State of Illinois, have invented certain new and useful Improvements in Combined Tractors and Road Vehicles, of which the following is a specification.

This invention relates to a draft implement so designed and constructed that it may run from one mile to twenty miles per hour, and which at the same time is provided with special ground tractive elements so constructed and arranged as to afford powerful tractive effect without undue weight when so desired. Heretofore it has frequently been the custom to make provision for the passage of tractors over hard roads by so constructing the ground wheels that the cleats thereon may be either withdrawn, covered over, or filled in in some manner so as to provide a smooth rolling surface for road use, but such expedients are objectionable and practically prohibitory in view of the time required in transforming the implement from a tractor to a road vehicle, and by reason of the excessive shock and vibration incident to the passage of such a heavy implement over a hard road.

In the case of the present invention, rubber tired wheels are provided which are adapted for road service, or for service in a field, but in addition thereto I employ a plurality of traction feet which, when the implement is advanced through a field, will be actuated in such a manner as to impart a walking motion and successively implanted on the ground in such a way as to exert a strong downward pressure instead of a backward slipping motion on the ground, which will serve to impart a powerful forward thrust to the implement, thereby supplementing the action of the wheels on any kind of ground. By the employment of mechanism of the character indicated it is possible to greatly reduce the weight and size of the implement as compared with tractors of the usual type, so that, for effective work, I am enabled to build an implement which, in length, breadth and weight, will be less than an average horse, but will possess the draft power of many horses.

In order to manipulate the implement within a compass no greater than that ordinarily necessary in the driving of horses, I have devised spiral steering and power transmission mechanism, which enables the implement to be turned practically at right angles to its longitudinal center, and this, together with the extremely small dimensions of the implement as a whole, permits its use under conditions which at present preclude the successful employment of tractors of the usual type. Furthermore, by the employment of walking feet for traction purposes in place of heavy and ponderous ground wheels, the rolling down and compacting of the soil which ordinarily attends the operation of heavy tractors of the usual type is avoided, with a consequent improvement in ground conditions for the seeding operations. Furthermore, the construction and arrangement of the traction feet and associated mechanism is such that these devices may be readily elevated and turned back out of the way when not in use, so that the implement may be operated as a road vehicle without interference, and if desired these elements can be housed in or covered over in such a way as to completely conceal them from view.

The present invention relates to the construction and arrangement of the traction feet; to the means for mounting and operating the same; to the means for steering the implement and imparting power to the front wheels, as well as to the rear wheels; to the method of mounting the gas tank in proximate relation to the engine; to the general arrangement of the power transmission; to the method of housing and protecting the gearing empolyed for driving the front wheels; and to the general construction and arrangement of the machine as a whole and constituent parts thereof.

In the drawings:

Figure 1 is a side elevation of the entire machine, with the engine hood and side cover plates removed;

Fig. 2 is a plan view, with the engine removed, showing the power transmission and steering elements and associated parts;

Fig. 3 is a side elevation of the entire machine;

Fig. 4 is a front elevation thereof;

Fig. 5 is a rear elevation thereof, with one of the wheels shown in section;

Fig. 6 is a sectional detail of the clutch for one of the rear wheels;

Fig. 7 is a sectional elevation of one of the traction feet;

Fig. 8 is a side elevation of the same, showing the foot in section;

Fig. 9 is a view partly in section, showing the front steering and power transmission mechanisms;

Fig. 10 is a top or plan view partially broken away, of the gear housing for one of the front wheels;

Fig. 11 is a sectional plan view of the same;

Fig. 13 is a longitudinal sectional view of the steering and power transmission clutch;

Fig. 14 is an end elevation of the same, showing the housing partly broken away;

Fig. 15 is a diagrammatic view showing the positions assumed by the traction feet in various stages of the cycles of operation;

Fig. 16 is a plan view, broken away at the center, of the fuel tank; and

Fig. 17 is an inside elevation of the same, showing the supporting post and piping partly in section.

Figure 12:
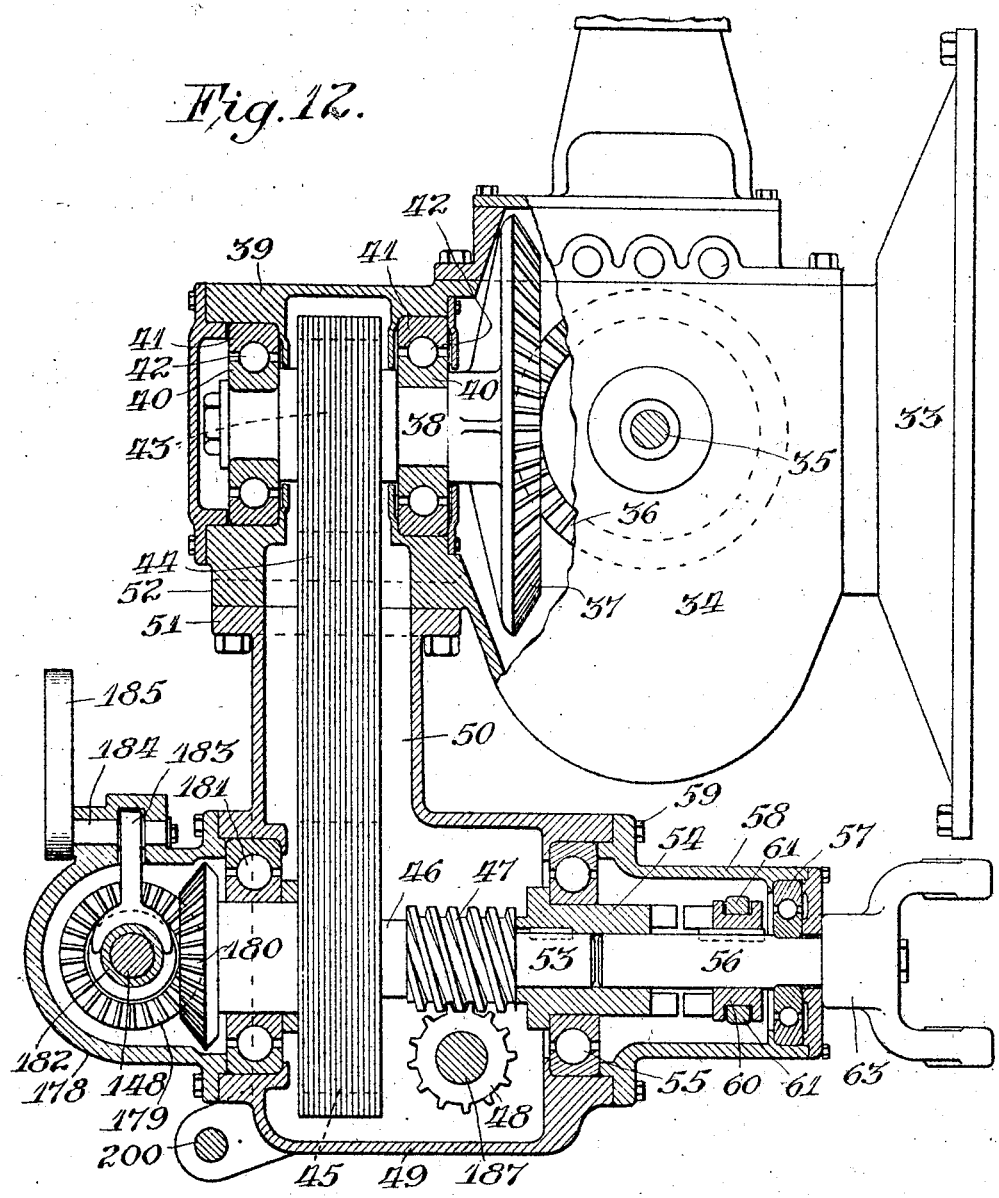
Fig. 12 is a view principally in section, showing certain of the power transmission elements.

The machine as a whole is carried by a frame comprising channeled side rails 20, which are connected at their rear by a cross rail 21, and at their front by means of a ribbed bridge plate 22, best shown in Fig. 4. Between the side rails is hung the engine 23 which is equipped with the usual carburetor 24, manifold 25, and water circulating pipes 26 leading to the radiator 27 which is carried by the bridge plate 22 in the usual manner. In addition to the above, a fan 28 driven by a fan belt 29 is employed, together with a starting crank 30 of the usual character, which is supported below the bridge plate 22 from a suspended cross frame 31 secured to the side rails 20, which cross frame supports the forward part of the engine.

The engine casing has bolted to its rear end a cylindrical fly wheel casing 32, which is closed by a closing plate 33 secured to the forward side of a gear box 34 which houses a series of differential speed gears of the usual character for affording three or more forward speeds and a reverse speed. The set of gears is not illustrated, since it may be of any usual or conventional character, but in Fig. 12 is shown the gear shaft 35 which carries a bevel faced driving pinion 36 meshing with a bevel faced driven pinion 37 mounted upon a stub shaft 38 projecting rearwardly through a drum shaped housing 39, secured to the rear face of the gear box and slightly to the left side of the longitudinal center, as shown in Fig. 2.

The stub shaft 38 carries forward and rear ball runways 40 which coact with fixed runways 41 and balls 42 to afford an antifriction bearing. The stub shaft 38 carries a pulley 43 which mounts a silent chain belt 44, which drives a lower pulley 45 carried by a worm shaft 46 having formed thereon a worm 47 which meshes with a worm gear 48.

The worm transmission mechanism just described is housed within a lower centrally disposed drum shaped housing 49, which merges into an obliquely disposed chain drive housing 50 provided with a flange 51 at its upper edge, which is bolted to a corresponding flange 52 formed on the base of the drum shaped housing 39, and merging into the rear wall of the gear box, as shown in Fig. 12, so that all portions of the engine and transmission housing are rigidly united into an integral structure.

The worm shaft 46, at its reduced forward end 53, has splined thereon a clutch element 54 which is journalled by ball bearings 55. The clutch element 54 is cored to receive the rear end of an aligned forward transmission shaft 56, carried by ball bearings 57 housed within a tubular forward housing 58 which is flanged, shouldered and bolted to the forward end of the housing 49 by bolts 59 (see Fig. 12).

The transmission shaft 56 has slidably splined thereon a driven clutch element 60 which is grooved to receive the fingers of a yoke 61 operated by means of an externally located handle 62 on the right side of the housing 58, as shown in Fig. 1. The transmission shaft 56, at its forward end, carries a yoke 63, which affords a vertical pivotal mounting for the trunnion head 64 of a power transmission link 65 carrying at its forward end a yoke 66, which mounts a vertically disposed trunnion 67 at the rear end of a forward transmission stub shaft 68, which is shown in detail in Fig. 9.

The stub shaft 68 enters a center housing 69 which rises from a front cross frame 70, which is hung from the side rails 20 by means of hangers 71 which are rigidly braced by means of diagonally extending braces 72, the lower ends of which are bolted to vertical ribs 73, the inner ends of which merge into the center housing 69, and the outer ends of which merge into a bifurcated yoke 74, to the upper arms of which the hangers 71 are directly secured by bolts 75 on each side of the machine. For convenience of assembly, the front cross frame is divided in the center, the two sections being bolted together.

The stub shaft 68 within the housing 69 carries a worm 76 which meshes with a worm gear 77 centrally and rigidly mounted upon a front transmission shaft 78 which is reduced at each end to receive a bevel pinion 79 journalled by ball bearing elements 80 mounted in runways which are set into a shouldered recess 81 on the inner side of the bifurcated yoke 74. Each driving bevel pinion 79 meshes with a center bevel pinion 82 which is loosely mounted upon a vertical steering standard 83 mounted within upper and lower bushings 84 and 85 entered through the upper and lower arms of the bifurcated yoke. Each center pinion 82 meshes with a hub pinion 86 which extends inwardly from a hub plate 87, which is bolted to the inner face of a hub 88 formed on a wheel web 89 carrying a grooved peripheral flange 90 which receives a rubber tread or tire 91. The outer side of each hub is closed by means of a hub cap 92, the parts being united by means of bolts 93 which extend through a flange on the cap and through the plate 87 as indicated.

Each hub is rotatably mounted by the provision of ball bearing elements 94 carried by the reduced outer end 95 of a stub axle 96, which is rigidly secured to and moves with the steering standard 83.

In order to prevent the ingress of dust or dirt, a gear box 97 is employed which surrounds the gears and which is provided on its outer wall with a slot 98 to permit a swinging movement of the axle 96, but in order to close this slot against the ingress of dirt, a flexible guard plate 99 is provided, the upper and lower edges of which are guided within channels formed by grooving the outer edges of the gear box and providing overlapping guide strips 100. The outer slotted portion of each gear box is of semi-cylindrical formation (see Fig. 11), and the guard plate, being preferably of thin flexible steel, and having its edges guided as indicated, will flex around the slotted portion of the gear box as the wheels are turned, and close the slot irrespective of said turning. In order to more certainly guide the free ends of the flexible strip, the same are entered within an outer sheath 101 which is flared at its outer end to conform to the dimensions of the inclosed parts, and is secured to the adjacent rib 73 by flanges 102, as shown in Fig. 10. As the wheel is turned, one end of the flexible guard strip will draw outwardly, and the other end will be thrust inwardly, as indicated by dotted lines in Fig. 11. The ball bearing elements 80 are held in place within the shoulders 81 by the provision of a circular ring plate 103 which is secured to the adjacent face of the yoke 74.

Each of the vertical steering standards 83 at its upper end is ribbed to receive a hub 104 of a rack segment 105, one of which is shown in Fig. 2, the other being removed for purposes of illustration. The two segments mesh with a centrally disposed gear 106 which has formed integrally thereon a bevel pinion 107 which meshes with a bevel pinion 108 carried by a steering shaft 109, the forward and rear ends of which are journalled through upstanding arms 110 of a bracket 111 secured to the center of the front cross frame. The stub steering shaft 109 is secured to a diagonally disposed link 112 by means of a universal connection 113. The rear end of the link is secured to a shaft section 114 by means of a universal connection 114ª. The rear end of the shaft section 114, as shown in Fig. 13, is entered through the forward end of a double clutch housing 115 of generally cylindrical shape, which housing, as shown, merges with a vertically elongated worm housing 116, the two housings being longitudinally split in a horizontal plane and flanged to receive connecting bolts 117 which unite the upper and lower sections together. The steering shaft section 114 is aligned with a rear shaft section 118, the aligned ends of the two shaft sections being loosely housed within a centrally disposed worm gear 119 provided with a hub 120 which is journalled within cored bosses 121 in the center of the housing.

The hub of the worm gear at its end is provided with a driving clutch face 122, the forward clutch face cooperating with a driven clutch element 123 which is grooved to receive a clutch yoke 124 carried by a sliding adjusting rod 125. The rear clutch element 122 coacts with a driven clutch element 126 which is grooved to receive a yoke 127, likewise mounted upon the adjusting rod 125. A sliding motion is imparted to the rod in either direction, through the medium of an arm 128 mounted upon a rock shaft 129 adapted to be rocked by a handle 130 located externally of the housing, which housing is provided with a dome-shaped elevation 131 to house the arm 128 and the rock shaft 129. By shifting the handle 130 in either direction the worm gear can be thrown into clutching position with either of the clutch elements and power transmitted in the desired direction.

The worm gear 119 meshes with a worm 132 within the worm box 116, which worm is carried by a vertical steering post 133 which extends upwardly through the floor of the implement and terminates in a steering wheel 134 in suitable and convenient proximity to a seat 135.

By throwing the forward clutch element 123 into clutching relation with the center worm gear the turning movements of the steering wheel will be transmitted, through connections described, to the steering elements at the forward end of the machine.

The rear shaft section 118, at its rear end, carries a spiral gear 136, which meshes with a spiral gear 137 mounted upon a rear cross shaft 138, the ends of which are journalled on each side within inner and outer depending brackets 139 and 140 respectively, which are bolted to the cross bar 21 of the main frame and are held in spaced relation to one another, as indicated in Fig. 5.

Each pair of brackets constitutes a vertical guideway for the upper arm 141 of an elbow-shaped foot frame 142, the lower forward end of which is pivoted between bracket arms 143 which are rigidly secured to the rear shaft housing 144 and are rigidly braced by means of depending brace rods 145 secured at their upper ends to the side rails of the main frame.

The upper arm 141 of each foot frame is of arcuate formation and is provided on its inner edge with a rack 146, which racks, one on each side of the machine, mesh with corresponding shroud gears 147 carried by the shaft 138, the arrangement being such that, as the shaft is rotated, the foot frames will be raised and lowered to the desired degree to throw the parts carried thereby either into or out of commission.

The two foot frames, at their forward ends are journalled upon a shaft 148, which in turn is journalled at each end between the respective pairs of bracket arms 143. The shaft 148 carries a sprocket wheel 152, which serves to impart power to an aligned rear spocket wheel 153 through the medium of a sprocket chain 154 (see Fig. 1).

The sprocket wheel 153 is mounted upon a cross shaft 155, which is journalled through the outer angles of the respective foot frames, and projects laterally therethrough. The cross shaft carries on its opposite ends eccentrics 156, each of which, as shown in Fig. 7, consists of two flat discs 157 terminating in elongated hub portions 158 which are keyed to the shaft.

The peripheries of the disc sections are grooved to afford in conjunction a channel 159 which receives an outer ball runway 160 which coacts with a similar inner runway 161 and ball bearings 162 to afford a rotatable mounting of the eccentric within a ring-shaped foot carrier 163, consisting of two side sections 164 which are shouldered to receive a center section 165, the parts being united together by the provision of tie bolts 166 extending through the three sections. The center section of each foot carrier, on its upper side, is extended to provide a slotted guide frame 167 of arcuate formation, which guide frames, on opposite sides of the upper arm 141, embrace and are guided by a cross bar 168 which is entered through shoulders 169 on the rear of the upper arms, and extends from side to side of the machine and unites the two foot frames together. The curvature of the guide frame is such as to impart to the foot carrier, when operated by the inclosed eccentric, the desired fore and aft and up and down movements presently to be described.

The lower portion of the foot frame is entered between a pair of side plates 170 which spring upwardly from a flat foot 171 shod by a flat tread 172, preferably of rubber or other resilient material, which is molded to the foot by the provision of dovetailed grooves 173 extending longitudinally, as indicated in Fig. 7. Each of the side plates 170 is provided with a pair of vertical slots 174 which receive the ends of guide bolts 175, and the foot is acted upon by a coil spring 176 which occupies the space intermediate the side plates and rests within a center recess 177 in the top of the foot. The spring is oval in cross section, its major axis extending from front to rear so as to better distribute the spring pressure longitudinally of the foot; and it will be noted from Fig. 1 that the toe of the foot is extended forwardly from the side plates a greater distance than the heel.

The shaft 148, which supplies power for driving the foot, is entered through a housing 178 bolted to the rear side of the worm housing 49 (see Fig. 12). Within the housing the shaft loosely carries a bevel pinion 179 in mesh with a driving bevel pinion 180 mounted on the rear end of the worm shaft 46, which at this point is journalled within ball bearing elements 181. The shaft has slidably keyed thereon a clutch element 182, which is grooved to receive the bifurcated end of a clutch yoke 183 carried by a rock shaft 184 operated by an externally positioned handle 185, which permits the shaft to be thrown into and out of clutch with the driving train as may be desired. It will be understood that although the various clutch operating handles as shown are of relatively short dimensions, the same may be extended or secured to appropriate connections to bring all of the controls within convenient reach of the driver's seat.

Rear wheels 186 are freely mounted upon a rear drive shaft 187 which carries the worm gear 48 in the worm box 49, and each rear wheel, as shown in the detail of Fig. 6, is provided with a hub 188 having an inner clutch face 189 which coacts with a slidable grooved clutch element 190 keyed to the shaft 187 and operated by a forked arm 191 operated by a handle 192 against the tension of a coil spring 193 bearing against a collar 194 held in place on the shaft by a set screw 195. Each of the rear wheels is provided with a rubber tire 196, suitable ball bearings 197 being provided to reduce friction. This arrangement permits either or both of the rear wheels to be unclutched, which may be desirable in case it becomes expedient to move the implement by hand for short distances. A hub cap 198 closes the hub and protects the end of the rear shaft. The shaft 187 is completely inclosed within the rear shaft housing 144, the inner ends of which are bolted to the worm housing 49.

The draft is transmitted through a draw rod 199 which at its forward end is secured between a pair of lugs 200 formed on the rear lower corner of the worm housing 49, and a power take-off pulley 201 is mounted upon the outer end of the shaft 35, which is extended through a journal box 202 (see Fig 2) held in rigid relation with the right hand side rail, by the provision of braces 203. The usual gear shift lever 204 extends upwardly from the gear box 34, within convenient reach of the driver's seat.

The forward end of the frame is supported upon a pair of leaf springs 205, the rear ends of which are rigidly clamped to the proximate side frame by U bolts 206 and a cross plate 207, and the forward end of each spring embraces a spring bolt 208 (see Fig. 9), which is carried by an inverted U-shaped clip 209 bolted to the proximate hanger 71, which hanger is shouldered at the point 210 and slotted at its upper end to receive a pair of bolts 211, which afford a sliding connection between the hanger and the proximate side rail 20.

The engine is housed on the right hand side by means of a side plate 212, which is hinged at its rear end by hinges 213 and held in closed relation at its forward end by latches 214, permitting the side plate to open forwardly. On the opposite side, the engine is inclosed by a gasolene tank 215 of relatively narrow elongated rectangular formation. The forward end of the gasolene tank stands in parallel relation with a tubular column 216, which is bolted to a concavo-convex upstanding bracket 217 provided with a foot 218 bolted to the proximate side rail 20. The tubular column 216 furnishes a pivotal mounting for the forward end of the gasolene tank, which is provided with upper and lower straps 219 and 220 which embrace the column, the lower strap being extended to surround the entire tank and furnish a reinforcement therefor.

The tank, in its lower forward wall, is perforated at the point 221 to deliver gasolene to a tubular elbow 222, the upper arm of which is threaded to receive an elbow 223 depending from a cross coupling 224, which is suitably connected with a gasolene pipe leading to the carburetor on the opposite side of the engine. In order to permit swinging of the gasolene tank the tubular standard is provided near its lower end with a slot 225 which affords clearance for the elbow 222. In order to hold the tank in partly open relation, the hook latch 226 is pivoted at its rear end to the side rail 20 in position to co-operate with an eye 227 depending from the lower inner corner of the tank, so that when the latter is swung outwardly to a limited extent, as indicated by dotted lines in Fig. 16, the hook may be inserted into the eye to hold the tank in position.

A headlight 228 is provided, extending completely across the upper portion of the radiator, which headlight is provided with a cylindrically formed concave reflector 229. A shield or visor 230 is provided, which is hinged at the point 231, and may be turned down into the position indicated in dotted lines in Fig. 3. The headlight, in each end wall, is provided with windows 232, the entire front of the headlight being closed for the transmission of a broad, flat, downwardly projected beam of light, affording a broad field of illumination in front of the machine. Electricity, kerosene, or other source of illumination may be provided.

In operation, with the front and rear wheel and foot transmissions all in clutched relation to receive power from the engine, the power will be transmited through the gear box, and through the transmission elements shown in Fig. 12, to the worm shaft 46, which constitutes the distributing center for the power transmission. The rear wheels being clutched to the cross shaft 187, will be directly rotated, and the front wheels will be rotated through the transmission line, consisting of the following elements: the shaft 56, link 65, forward shaft 68, worm gearing 76 and 77, front transmission shaft 78, and beveled gearing 79, 82, 86, to the respective hubs of the forward wheels. This forward transmission will be effective irrespective of the angular position of the front steering wheels, by reason of the provision of the axially mounted center gears 82.

Concurrently with the driving wheels, the feet will be actuated through the following transmission elements deriving power from the worm shaft 46: the beveled gearing 180 and 179, driving the shaft 148, which carries the sprocket pinion 152, thence through the sprocket chain 154 to the sprocket 153 mounted upon the cross shaft 155 which carries the eccentrics 156. The revolution of the eccentrics, through the anti-friction bearings shown, will impart walking movements to the four feet which are guided by the slotted guides 167, which engage the fixed cross guide bar 168, and the character of these movements is diametrically illustrated in Fig. 15. The medial position of the foot is indicated in full lines, and the several positions of approach toward and recession from the ground are indicated in dotted lines.

From this diagram, it will be noted that the foot approaches the ground with the toe obliquely elevated, striking the ground heel first. The contact of the heel with the ground serves to compress the spring 176 until the foot is implanted in the medial flatwise position, after which the toe will begin to press downwardly, thereby imparting a powerful forward thrust to the rear of the machine, which will continue until the foot is lifted clear of the ground on the rear stroke, after which the foot will swing over idle in position to take a succeeding step in the manner previously indicated. During the thrusting operation of the foot, it will remain firmly implanted on the ground in practically immovable relation thereto, the spring affording the necessary resiliency to permit the foot to maintain a firm and practically immovable ground contact during the thrusting operation, so that slippage will be avoided, and a powerful thrust imparted in a downward and back direction which supplements the action of the wheels, which latter will serve to prevent any wobbling or lateral swaying movement which might be occasioned if the foot alone were relied upon for ground contact.

The feet are arranged on opposite sides of the machine to operate in pairs, the two outermost feet moving in unison, and the other, innermost feet likewise moving in unison, so that the foot action of the machine will be symmetrically distributed on opposite sides, and any lateral or torsional thrusts avoided. The arrangement is one which permits the feet to step over obstructions of a character which would prevent the wheels from rolling over, since a fixed rather than a rolling ground contact is maintained by the feet.

When it is desired to regulate the elevation of the feet, for tractive purposes, or to completely elevate the same into idle position, in preparation for road travel, the clutch arm 130 is moved to the position indicated in Fig. 13, which throws the steering wheel into train with the shaft 138 which is in train with the rack teeth 146 on the upper arms of the foot frames. Thereafter, by a turning of the steering wheel (temporarily unclutched from the steering transmission), the foot frames may be elevated into position to house the feet, soles backward, closely under the driver's seat and in an inconspicuous and non-interfering position for road travel. If desired, a rear housing can be provided which will completely house the feet from view, so that the implement will then present the general appearance of a regulation road vehicle.

When the feet are thus lifted to idle position, the shaft 148 may be unclutched and the feet will rest idle in elevated position during road travel. With the feet thus disposed of, the clutch handle 130 will be thrown to the right (see Fig. 13) which will entrain the steering wheel with the shaft 114, which through suitable linkage imparts steering movements to the centrally disposed pinion 106. The rotation of this pinion will impart corresponding turning movements to the two wheels through the medium of the segments 105, vertical steering standards 83, and axles 96. During these steering movements the inclosed gearings will be at all times housed and protected by the sliding movements of the flexible guard or strips 99.

In warm weather, when it is desirable to supplement the cooling of the radiator, the right hand side plate of the engine housing, which opens forwardly, can be swung out into oblique relation to furnish an indraft of air to the engine casing, and the gasolene tank can be swung outwardly into oblique relation on the opposite side and latched, which would provide a continuous cross draft through and around the engine and along the inner wall of the gasolene tank, thereby serving to cool these parts to a substantial degree.

The method of connecting the housing for the various transmission elements serves to afford a practically integral under framing of rigid construction united with the engine casing in such a way as to afford a complete housing for all the movable parts and a rigid reinforcement for supporting the transmission elements.

The arrangement is one which permits of four of the ground wheels to have uniform traction with all four feet, or, if desired, the feet may have traction with one, two or three wheels, or be thrown out of gear with all four wheels, and the latter allowed to roll idly, in which case the feet alone will serve to force the tractor forward with the full power of the engine.

The combined tractor and road vehicle is so compact that it can be operated between rows of corn, and in gardens and orchards, doing work that cannot be accomplished with the ordinary tractor. By building extensions upon the feet, the tractor will travel over deep snow or on very soft ground, the extensions acting similar to a man equipped with snow shoes.

The combined tractor and road vehicle, as shown in Fig. 3, is designed to serve as a runabout and carry four passengers and two trunks, provision being made within the railing above the engine for the reception of trunks or luggage when traveling on the road, and when used for hauling purposes the implement can pull four plows in a field, while its light weight, eighteen hundred pounds, together with the rubber-tired wheels, admits of its use on paved streets or roads without danger of injury to the pavement.

Although the invention has been described with particularity as to detail, it will be understood that many of the features herein described may be changed or modified without departing from the spirit of the invention.

I claim:

1. In an implement of the class described, the combination of a frame, front and rear ground wheels supporting the frame, transmission elements for imparting power to the rear wheels, a steering wheel, a connection for imparting steering movements to the front wheels, a foot frame, a foot secured to the foot frame, power transmission elements for imparting walking movements to the foot, and means for raising and lowering the foot frame to bring the foot out of and into ground engaging position, said means adapted to be entrained with the steering wheel and to be actuated thereby.

2. In an implement of the class described, the combination of a frame, front and rear ground wheels supporting the frame, transmission elements for imparting power to the rear wheels, a steering wheel, a connection for imparting steering movements to the front wheels, a foot frame pivoted to the main frame, a foot secured to the free end of the foot frame, power transmission elements for imparting walking movements to the foot, and means for raising and lowering the free end of the foot frame to bring the foot out of and into ground engaging position, said means adapted to be entrained with the steering wheel and to be actuated thereby.

3. In an implement of the class described, the combination of a frame, an engine carried by the frame, ground wheels supporting the frame, power transmission elements for imparting power to the ground wheels, a foot frame, a foot secured to the foot frame, power transmission elements for imparting walking movements to the foot, and means for raising and lowering the foot frame to bring the foot out of and into ground engaging position.

4. In an implement of the class described, the combination of a frame, an engine carried by the frame, ground wheels supporting the frame, power transmission elements for imparting power to the ground wheels, a foot secured to the frame, power transmission elements for imparting walking movements to the foot, means for raising and lowering the foot out of and into ground engaging position, steering elements for one of the ground wheels, and means for actuating the foot elevating means through power derived from certain of the steering elements.

5. In an implement of the class described, the combination of a frame, an engine carried by the frame, ground wheels supporting the frame, power transmission elements for imparting power to certain of the ground wheels, a foot frame secured to the rear of the main frame, a cross guide bar rigidly mounted upon the foot frame, a shaft carried by the foot frame, means for imparting rotation to said shaft, a plurality of foot carriers carried by the foot frame, operating connections between said shaft and each of said foot carriers, a guide for each foot carrier embracing the cross guide bar, and a foot carried by each foot carrier.

6. In an implement of the class described, the combination of a frame, an engine carried by the frame, ground wheels supporting the frame, power transmission elements for imparting power to certain of the ground wheels, a foot frame pivoted to the main frame, means for raising and lowering the free end of the foot frame, a cross guide bar rigidly mounted upon the foot frame, a shaft carried by the foot frame, means for imparting rotation to said shaft, a plurality of foot carriers carried by the foot frame, operating connections between said shaft and each of said foot carriers, a guide for each foot carrier embracing the cross guide bar, and a foot carried by each foot carrier.

7. In an implement of the class described, the combination of a frame, an engine carried by the frame, ground wheels supporting the frame, power transmission elements for imparting power to selected ground wheels, a foot frame pivotally connected to a portion of the main frame and extending rearwardly thereof, means for raising and lowering the free end of the foot frame, a cross guide bar rigidly carried by the foot frame, a shaft extending transversely of the foot frame and journaled near the free end thereof, power transmission elements for imparting rotation to said shaft, a plurality of eccentrics mounted upon said shaft, a plurality of foot carriers encircling said eccentrics, each foot carrier having a foot depending therefrom, and each foot carrier having a slotted guide extending upwardly therefrom and embracing the fixedly mounted guide bar.

8. In an implement of the class described the combination of a main frame and power transmission elements of a foot frame adjustably secured to the main frame, an eccentric carried by the foot frame and in train with the power transmission elements, a foot carrier embracing the eccentric, and a foot secured to the foot carrier.

9. In an implement of the class described, the combination of a main frame and power transmission elements of a foot frame adjustably secured to the main frame, an eccentric carried by the foot frame and in train with the power transmission elements, a foot carrier embracing the eccentric, and a foot yieldably secured to the foot carrier.

10. In an implement of the class described, the combination of a main frame and power transmission elements of a foot frame adjustably secured to the main frame, an eccentric carried by the foot frame and in train with the power transmission elements, a foot carrier embracing the eccentric, and a foot secured to the foot carrier, and guide members for guiding the movements of the foot carrier to impart walking movements to the foot.

11. In an implement of the class described, the combination of a main frame and power transmission elements of a foot frame adjustably secured to the main frame, an eccentric carried by the foot frame and in train with the power transmission elements, a foot carrier embracing the eccentric, and a foot yieldably secured to the foot carrier, and guide members for guiding the movements of the foot carrier to impart walking movements to the foot.

12. In an implement of the class described, the combination of a main frame, power transmission elements carried by the main frame, a foot frame pivoted to the main frame, a foot carrier mounted at the free end of the foot frame, means for raising and lowering the free end of the foot frame, an eccentric in train with the power transmission elements for imparting movements to the foot frame, and a foot secured to the foot carrier.

13. In an implement of the class described, the combination of a main frame, power transmission elements carried by the main frame, a foot frame pivoted to the main frame, a foot carrier mounted at the free end of the foot frame, means for raising and lowering the free end of the foot frame, an eccentric in train with the power transmission elements for imparting movements to the foot frame, and a foot yieldably secured to the foot carrier.

14. In an implement of the class described, the combination of a main frame, power transmission elements carried by the main frame, a foot frame pivoted to the main frame, a foot carrier mounted at the free end of the foot frame, means for raising and lowering the free end of the foot frame, an eccentric in train with the power transmission elements for imparting movements to the foot frame, a foot secured to the foot carrier, and guiding means in part on the foot carrier and in part on the foot frame for controlling the walking movements of the foot.

15. In an implement of the class described, the combination of a main frame, power transmission elements carried by the main frame, a foot frame adjustably secured to the main frame, a foot carrier mounted on the foot frame, means for raising and lowering the foot frame, means in train with the power transmission elements for imparting movements to the foot frame, a foot secured to the foot carrier, and guiding means in part on the foot carrier and in part on the foot frame for controlling the walking movements of the foot.

16. In an implement of the class described, the combination of a main frame, a foot frame pivotally secured at its forward end to the main frame and provided with an arcuate rack concentric with the pivotal point, a pinion meshing with the rack for raising and lowering the free end of the foot frame, a shaft carried by the free end of the foot frame and in train with the power transmission elements, an eccentric carried by said shaft, a ring shaped foot carrier encircling said eccentric, and a foot secured to the foot carrier.

17. In an implement of the class described, the combination of a main frame, a foot frame, pivotally secured at its forward end to the main frame and provided with an arcuate rack concentric with the pivotal point, a pinion meshing with the rack for raising and lowering the free end of the foot frame, a shaft carried by the free end of the foot frame and in train with the power transmission elements, a foot carrier operatively connected with said shaft, and a foot secured to the foot carrier.

18. In an implement of the class described, the combination of a main frame, a foot frame pivotally secured at its forward end to the main frame and provided with an arcuate rack concentric with the pivotal point, a pinion meshing with the rack for raising and lowering the free end of the foot frame, a shaft carried by the free end of the foot frame and in train with the power transmission elements, an eccentric carried by said shaft, a ring shaped foot carrier encircling said eccentric, and a foot secured to the foot carrier, a guide bar carried by the foot frame, and a guide member carried by the foot carrier and engaging said bar for guiding the foot in walking movements.

19. In an implement of the class described, the combination of a main frame, a foot frame pivotally secured at its forward end to the main frame and provided with an arcuate rack concentric with the pivotal point, a pinion meshing with the rack for raising and lowering the free end of the foot frame, a shaft carried by the free end of the foot frame and in train with the power transmission elements, a foot carrier operatively connected with said shaft, and a foot secured to the foot carrier, a guide bar carried by the foot frame, and a guide member carried by the foot carrier and engaging said bar for guiding the foot in walking movements.

20. In an implement of the class described, the combination with a main frame and power transmission elements of a ring shaped foot carrier, a support for the foot carrier, an eccentric rotatably mounted within the foot carrier, means for revolving said eccentric, the foot comprising a sole and upstanding side plates slidably connected, each having a pair of vertical slots, pins entered through said slots for slidably connecting the foot with the foot carrier, and a spring interposed between the sole and the foot carrier.

21. In an implement of the class described, the combination of a main frame and power transmission elements of a ring shaped foot carrier, a support for the foot carrier, an eccentric rotatably mounted within the foot carrier, means for revolving said eccentric, the foot comprising a sole and upstanding side plates slidably connected each having a pair of vertical slots, pins entered through said slots for slidably connecting the foot with the foot carrier, and a spring interposed between the sole and the foot carrier, a slotted guide member outwardly projecting from the foot carrier, and a fixed guide rod entered into said guide member.

22. In an implement of the class described, the combination of a main frame, power transmission elements carried by the main frame, a steering post, a foot frame pivotally supported by the main frame and provided with a concentrically extending rack, a pinion meshing with said rack, transmission elements extending from the steering post and in train with said pinion for raising and lowering the foot frame, an eccentric revolubly mounted on said foot frame and in train with the power transmission elements, a ring shaped foot carrier embracing said eccentric, and a foot connected to said foot carrier.

23. In an implement of the class described, the combination of a main frame, power transmission elements carried by the main frame, a steering post, a foot frame pivotally supported by the main frame and provided with a concentrically extending rack, a pinion meshing with said rack, transmission elements extending from the steering post and in train with said pinion for raising and lowering the foot frame, an eccentric revolubly mounted on said foot frame and in train with the power transmission elements, a ring shaped foot carrier embracing said eccentric, and a foot connected to said foot carrier, and guiding elements between the foot carrier and the foot frame.

24. In an implement of the class described, the combination of a main frame, power generating mechanism carried by the main frame, forward and rear driving wheels supporting the main frame, a worm shaft, power connections, including variable speed gears for driving the worm shaft, a rear driving axle for the rear wheels, worm gearing on the worm shaft and rear axle respectively, forward power transmission elements adapted to be clutched to the worm shaft, a forward driving shaft in train with the forward power transmission elements, swivelly mounted forward axles for the forward wheels, steering elements for imparting steering movements to said axles, transmission beveled gearing for each forward wheel, including a beveled gear on the forward driving shaft, a beveled gear connected with the forward wheel, and a medial intermeshing beveled gear coaxially mounted with respect to the axis of steering movement of the associated forward wheel, a foot carried by the foot frame, means for imparting walking movements to said foot, and transmission mechanism including a clutch for actuating said means by power derived from the worm shaft.

25. In an implement of the class described, the combination of a main frame, power generating mechanism carried by the main frame, forward and rear driving wheels supporting the main frame, a worm shaft, power connections, including variable speed gears for driving the worm shaft, a rear driving axle for the rear wheels, worm gearing on the worm shaft and rear axle respectively, forward power transmission elements adapted to be clutched to the worm shaft, a forward driving shaft in train with the forward power transmission elements, swivelly mounted forward axles for the forward wheels, steering elements for imparting steering movements to said axles, transmission beveled gearing for each forward wheel, including a beveled gear on the end of the forward driving shaft, a beveled gear connected with the forward wheel, and a medial intermeshing beveled gear coaxially mounted with respect to the axis of steering movement of the associated forward wheel, a slotted housing for the beveled gearing, and a flexible slidably mounted gear plate movable with the wheel in its swivelling movements and overlying the slot in the housing, and means on the housing for holding the flexible plate in closed contact therewith, a foot carried by the foot frame, means for imparting walking movements to said foot, and transmission mechanism including a clutch for actuating said means by power derived from the worm shaft.

DARIUS T. PHILLIPS.